Nov. 27, 1923.                                    1,475,518
C. B. SNIDER
TIRE REMOVING TOOL
Filed Jan. 18, 1923
FIG. 1.
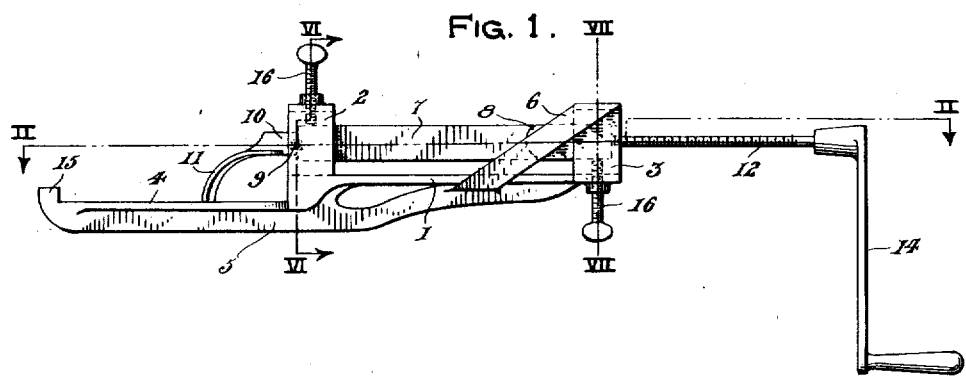
FIG. 2.
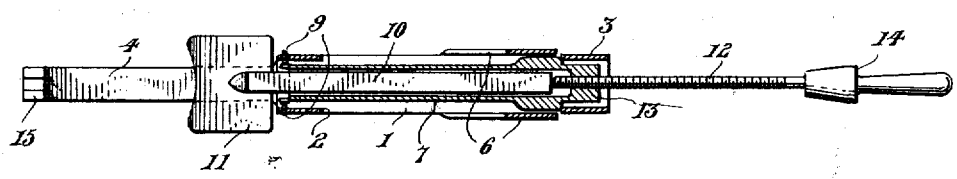
FIG. 3.            FIG. 4.
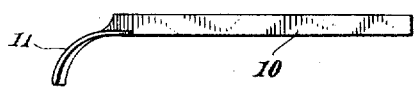   
FIG. 7.   FIG. 6.        FIG. 5.
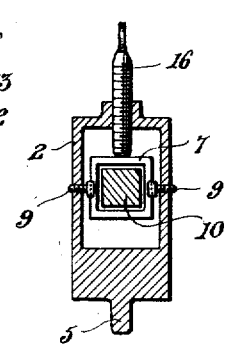  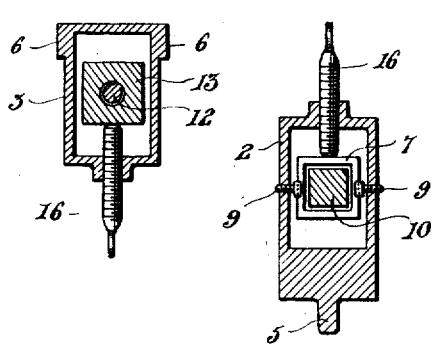   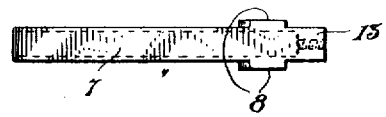
Inventor
C. B. Snider
By
F. H. Bryant
Attorney Patented Nov. 27, 1923.

1,475,518

UNITED STATES PATENT OFFICE.

CLINT B. SNIDER, OF INDEPENDENCE, KANSAS.

TIRE-REMOVING TOOL.

Application filed January 18, 1923. Serial No. 613,465.

*To all whom it may concern:*

Be it known that I, CLINT B. SNIDER, a citizen of the United States of America, residing at Independence, in the county of Montgomery and State of Kansas, have invented certain new and useful Improvements in Tire-Removing Tools, of which the following is a specification.

This invention relates to improvements in tire removing tools and particularly to the type for removing a pneumatic tire from the wheel rim.

One of the objects of the invention is to provide a device especially designed for removing a pneumatic tire from a wheel rim wherein the device, when placed in operative position on a wheel rim and tire, has power applied thereto for forcibly disengaging the tire from the rim and overcoming such difficulties as the tire being rusted to the rim or otherwise improperly held thereon.

The invention further provides improvements in the art, especially over the device shown and described in application filed by C. B. Snider on November 14, 1922, Serial No. 600,919.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a tire removing tool constructed in accordance with the present invention, Figure 2 is a longitudinal sectional view taken on line II—II of Fig. 1 showing the laterally shiftable casing slidably enclosing a tire engaging member, Figure 3 is a side elevational view of the tire engaging member removed from the casing, Figure 4 is a side elevational view of the shiftable casing with the tire engaging member removed therefrom, Figure 5 is a top plan view of the casing showing the side lugs that prevent longitudinal shifting movement of the casing in the supporting frame, Figure 6 is a cross-sectional view taken on line VI—VI of Fig. 1 showing the stop screws carried by the outer end of the frame preventing sliding movement of the shiftable casing with the adjusting screw associated with the casing and frame for positioning the same with respect to the tire, and Figure 7 is a cross-sectional view taken on line VII—VII of Fig. 1 showing the screw adjustment for the inner end of the shiftable casing.

Referring more in detail to the accompanying drawing, there is illustrated a tire removing tool including a frame composed of a bar 1 carrying a perpendicular frame 2 at its forward end, and a similar frame 3 at its rear end, the forward end of the bar 1 being further provided with an elongated arm 4 while a reinforcing rib 5 is carried by the bar and arm. As shown more clearly in Fig. 1, diagonal braces 6 extend between the outer ends of the rectangular frame 3 and the bar 1 at each side of said frame.

An elongated casing 7, rectangular in cross-section, has its opposite ends positioned in the rectangular frames 2 and 3, the casing 7 being transversely slidable in the frames 2 and 3, and so constructed and mounted to be held against longitudinal movement. The inner end of the casing 7 at each side thereof is provided with a laterally directed shoulder 8, the rear sides of said shoulder engaging the forward edges of the side walls of the frame 3 as shown in Fig. 2, while pins or set screws 9 carried by the side walls of the forward frame 2 are disposed to be engaged by the forward end of the casing 7, as shown in Fig. 2, the casing being transversely shiftable and held against longitudinal movement.

A tire engaging member is carried by the casing 7, and includes an elongated rod 10, rectangular in cross-section, and carries upon the forward end thereof an arcuate tire engaging foot 11. The rod 10 is slidable within the casing 7 and is prevented from rotation therein by the cross-sectional configuration above described.

The operating means for shifting the tire engaging member includes a threaded rod 12 working in a threaded bore formed in the head 13 carried by the inner end of the casing 7 as clearly shown in Figs. 2 and 4, the outer end of the operating rod 12 being provided with a handle 14. Upon rotation of the threaded rod 12, the inner end thereof engages the adjacent end of the rod 10 for longitudinally shifting the rod and positioning the arctuate foot 11 for engagement with a tire, the outer end of the arm 4 carried by the frame being provided with a hook 15 for engagement with a wheel rim for anchoring the frame on the rim when the tire engaging member is forcing the opposite side of a tire from engagement with the rim.

In positioning the tool on a wheel rim and tire, the hook 15 engages the lower side flange of a wheel rim, it being assumed that the rim and tire are horizontally disposed, the operating screw rod 12 being moved to its limit of movement, as shown in Figs. 1 and 2 with the tire engaging foot 11 of the rod 10 engaging the upper side or bead of a tire. The casing 7 being transversely slidable in the rectangular frames 2 and 3, the adjusting screw 16 extending through the outer wall of the frame 2 is first operated for engaging the outer end of the casing 7 for shifting the casing and tire engaging member carried thereby in a direction toward the tire for properly positioning the foot 11, the adjusting screw 16 threaded through the outer end wall of the frame 3 being then operated for transversely shifting the other end of the casing 7 in the opposite direction, causing the casing 7 to fulcrum at its point of engagement with the adjusting screw 16 for holding the tire engaging foot 11 in a substantially rigid and binding engagement with a tire or bead. Operation of the screw rod 12 by the handle 14 will cause the rod 10 to be projected from the casing 7 and with the foot 11 engaging the tire, the latter will be readily removed from a wheel rim, and such inconveniences as the tire being rusted to the rim will be readily overcome and the tire easily and quickly removed therefrom.

From the above detail description of the device, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed as new is:—

1. In a tire removing tool, a frame including a bar and a forwardly extending arm, a rim engaging hook carried by the outer end of the arm, a casing transversely slidable on the frame, a rod slidable in the casing, a tire engaging foot carried by the outer end of the rod, and operating means for the rod carried by the casing.

2. In a tire removing tool, a frame including a bar and a forwardly extending arm, a rim engaging hook carried by the outer end of the arm, a casing transversely slidable on the frame, a rod slidable in the casing, a tire engaging foot carried by the outer end of the rod, and an operating screw threaded in the inner end of the casing engaging the rod to force the foot into contact with a tire.

3. In a tire removing tool, a frame including a bar and a forwardly extending arm, a rim engaging hook carried by the outer end of the arm, a rectangular frame at each end of the bar, a casing having its ends positioned in the rectangular frames and slidable transversely of the tool frame, a rod slidable in the casing and having a tire engaging foot at its outer end, and an operating screw threaded through the inner end of the casing engaging the rod for moving the foot into engagement with a tire.

4. In a tire removing tool, a frame including a bar and a forwardly extending arm, a rim engaging hook carried by the outer end of the arm, a rectangular frame at each end of the bar, a casing having its ends positioned in the rectangular frames and slidable transversely of the tool frame, cooperating means carried by the rectangular frames and casing to prevent longitudinal shifting movements of the casing relative to the frame bar, a rod slidable in the casing and having a tire engaging foot at its outer end, and an operating screw threaded through the inner end of the casing engaging the rod for moving the foot into engagement with a tire.

In testimony whereof I affix my signature.

CLINT B. SNIDER